(12) United States Patent
Mohla et al.

(10) Patent No.: US 7,097,688 B1
(45) Date of Patent: Aug. 29, 2006

(54) METHOD FOR PRODUCING SILICON BASED ALLOYS IN ATOMIZED FORM

(75) Inventors: Prem P. Mohla, Westlake, OH (US); Gregory W. Schott, Beverly, OH (US); Clinton J. Holley, Marietta, OH (US); John W. Casto, Amesville, OH (US)

(73) Assignee: Globe Metallurgical, Inc., Beverly, OH (US)

( * ) Notice: Subject to any disclaimer, the term of this patent is extended or adjusted under 35 U.S.C. 154(b) by 0 days.

(21) Appl. No.: 10/390,468

(22) Filed: Mar. 17, 2003

Related U.S. Application Data

(60) Provisional application No. 60/364,938, filed on Mar. 15, 2002.

(51) Int. Cl.
  *B22F 9/08* (2006.01)
(52) U.S. Cl. ...................................... 75/338
(58) Field of Classification Search ................. 75/338, 75/339
  See application file for complete search history.

(56) References Cited

U.S. PATENT DOCUMENTS 4,272,463 A * 6/1981 Clark et al. .................... 75/337
4,647,305 A * 3/1987 Kumai et al. .................. 75/337
4,956,011 A * 9/1990 Nishida et al. ............... 75/230

* cited by examiner

Primary Examiner—George Wyszomierski
(74) Attorney, Agent, or Firm—DLA Piper Rudnick Gray Cary US LLP

(57) ABSTRACT

A method for producing an alloy in atomized form, wherein the alloy includes between about 10% to about 100% of a silicon based alloy, including obtaining a base silicon-iron alloy mixture and an atomization unit having an atomization chamber and a plurality of nozzles, injecting an atomizing fluid into the atomization chamber via the plurality of nozzles, introducing the base silicon-iron alloy mixture into the atomization chamber such that the atomizing fluid impinges on the base silicon-iron alloy mixture to produce the alloy in atomized form, cooling the alloy in atomized form using a pool of water so as to produce a cooled alloy product, retrieving the cooled alloy product and drying the cooled alloy product to produce the alloy in atomized form.

8 Claims, 6 Drawing Sheets

75% Foundry Grade Product Comparison

| | Conventional grinding Method (Weight %) | Water Atomized Method (Weight %) |
|---|---|---|
| Silicon | 76.39 | 74.69 |
| Calcium | 1.19 | .85 |
| Aluminum | 1.33 | 1.17 |
| Balance Iron plus trace elements | | |
| Oxygen | 2.29 | 1.20 |
| + 18 mesh | | |
| + 30 mesh | .62 | 1.40 |
| + 70 mesh | .70 | 1.26 |
| Pan | .61 | 1.27 |

FIGURE 5

Product Comparison

| | Conventionally Crushed | Water Atomized | Gas Atomized |
|---|---|---|---|
| Silicon | 63.45 | 65.26 | 64.77 |
| Aluminum | 0.75 | 0.62 | 0.84 |
| Calcium | 1.35 | 0.95 | 1.00 |
| Zirconium | 4.30 | 4.19 | 4.21 |
| Oxygen (%) | 0.40 | 0.90 | 0.025 |

METHOD FOR PRODUCING SILICON BASED ALLOYS IN ATOMIZED FORM

RELATED APPLICATION INFORMATION

This application claims priority from Provisional Application No. 60/364,938 filed Mar. 15, 2002.

FIELD OF THE INVENTION

The present disclosure relates generally to the production of alloys and more particularly to a method for producing silicon and silicon based alloys in an atomized form having various sizes.

BACKGROUND OF THE INVENTION

Silicon and Silicon based alloys are well known and are used in a variety of applications. Currently, these alloys are created by melting a predetermined amount of silicon and a combination of metals together into a molten metal liquid. The molten metal liquid is then disposed in a cast or cast iron chill and cooled to form a resultant ingot, which is then crushed via a mechanical means to produce a silicon or silicon-based alloy product. The product is then screened and sized to obtain a desired screen distribution.

Unfortunately, however, these current production methods have a number of problems and produce a product having a number of undesirable characteristics. For example, because these methods include slowly cooling the cast containing the molten metal liquid, the individual grains of the inoculants are typically full of porosity and gas holes. Moreover, the microstructure also tends to reveal that the different metallurgical phases into which the alloying elements are distributed are not very well distributed, resulting in a coarse segregation of the alloying elements. Additionally, the planes of material fracture appear to be richer in impurities and the shape of the product is irregular and often consists of splintered pieces. Lastly, an appreciable amount of dust is created during the crushing and sizing process.

One method that may be used to increase the quality of the product relates to the use of atomization. Atomization is a well-known process that involves introducing a pressurized volume of gas and/or liquid with a liquid molten stream to cause the formation of droplets that are usually smaller than 100-mesh in size. Currently, conventional water and gas atomization processes are the most popular methods and presently account for the bulk of existing atomized materials, where materials produced using water atomization have a high surface oxygen content and materials produced using inert gas atomization have a low surface oxygen content. The high surface oxygen content resulting from the water atomization process is mainly due to the oxygen content in water. This is why the gas atomization process, which uses a gas without oxygen or with a very low oxygen content, is preferred. A low surface oxygen content advantageously allows for the element to be better dispersed throughout the product which results in a more efficient grain distribution structure and thus an improved reactivity.

Typically, the major components of an atomization facility include a melter, an atomization chamber and a dryer (for water atomization). The melter is used to melt a metal or combination of metals into a molten metal liquid that is poured into a tundish, which acts as a reservoir. The metal may be melted following standard protocols where induction melting, smelting or fuel-heating are suitable procedures. The molten metal is then funneled from the tundish, through a metered nozzle having a size that is responsive to the freezing characteristics of the molten metal and into the atomization chamber where a high or low-pressure atomizing nozzle impinges upon the molten metal stream. This causes the formation of molten metal droplets having various sizes, wherein the droplet size is dependent upon the pressure and volume of the impinging stream of gas and/or liquid. Thus, by regulating the parameters of the atomization process, such as the pressure and molten flow rates, the particle size, the particle size distribution, the particle shape, the chemical composition and the microstructure of the particles may be controlled and varied as desired.

The molten metal stream is then cooled by falling vertically through the atomization chamber, wherein the atomization chamber is filled with an inert gas, an inert liquid and/or a combination thereof. The cooled droplets of molten metal may then be sent to a wet screening system or to a drying system, where if the drying system is a gas drying system, horizontal cooling tubes may also be used to cool the molten metal droplets.

However, although the atomization process has existed since approximately 1945, applying the process with different alloys while regulating the atomization process parameters to control the resulting composition (such as producing 40% to 80% by weight silicon alloys) has not been tried until recently and may be particularly advantageous when trying to produce a product whose content requires a controlled distribution of an element, or elements, by weight. The advantage of using the atomization process to produce silicon based alloys may be seen by recognizing that conventional water atomization processes typically have high pressure ranges from 600 to 5000 psi depending on the size of particles desired. Whereas, a much lower-pressure atomizing stream may be used to make silicon or silicon based alloys in the desired size range of 5-mesh to 500-mesh.

Thus, there is a need for a method for producing silicon and silicon based alloys in atomized form.

SUMMARY OF THE INVENTION

The present disclosure addresses the above-identified need by providing a method for producing an alloy in atomized form, wherein the alloy includes between about 10% to about 100% of a silicon or silicon based alloy, including obtaining a base silicon-iron alloy mixture and an atomization unit having an atomization chamber and a plurality of nozzles, injecting an atomizing substance, such as a fluid or gas, into the atomization chamber via the plurality of nozzles, introducing the base silicon-iron alloy mixture into the atomization chamber such that the atomizing substance impinges on the base silicon-iron alloy mixture to produce the alloy in atomized form, cooling the alloy in atomized form using a pool filled with a cooling substance, such as water or liquid gas, so as to produce a cooled alloy product, retrieving the cooled alloy product and drying the cooled alloy product to produce the alloy in atomized form.

BRIEF DESCRIPTION OF THE DRAWINGS

Referring to the exemplary drawings wherein like elements are numbered alike in the several Figures:

FIG. 5 shows resultant data of additional production test runs conducted on a first highly automated production line and a second highly automated production line; and FIG. 6 shows resultant data of production test runs showing comparison data between a convention method, a water atomization method and a gas atomization method.

DETAILED DESCRIPTION OF THE INVENTION

The exemplary embodiments of the method for producing silicon-based alloys in atomized form are discussed herein in terms of an initial test performed using a standard water-atomizer unit which used high pressures to atomize standard alloys, wherein the standard water-atomizer unit was converted to a low atomizing pressure configuration head. Moreover, the standard water-atomizer unit included an induction furnace having a capacity of two hundred pounds of a base silicon-iron mixture, which included the elements of calcium, aluminum, manganese, barium, bismuth, magnesium, zirconium, rare earth strontium, titanium, carbon, sulfur, oxygen, nitrogen, or phosphorus and any other elements suitable to the desired end purpose. Reference will now be made in detail to the exemplary embodiments of the disclosure, which are illustrated in the accompanying figures.

Figure 1:
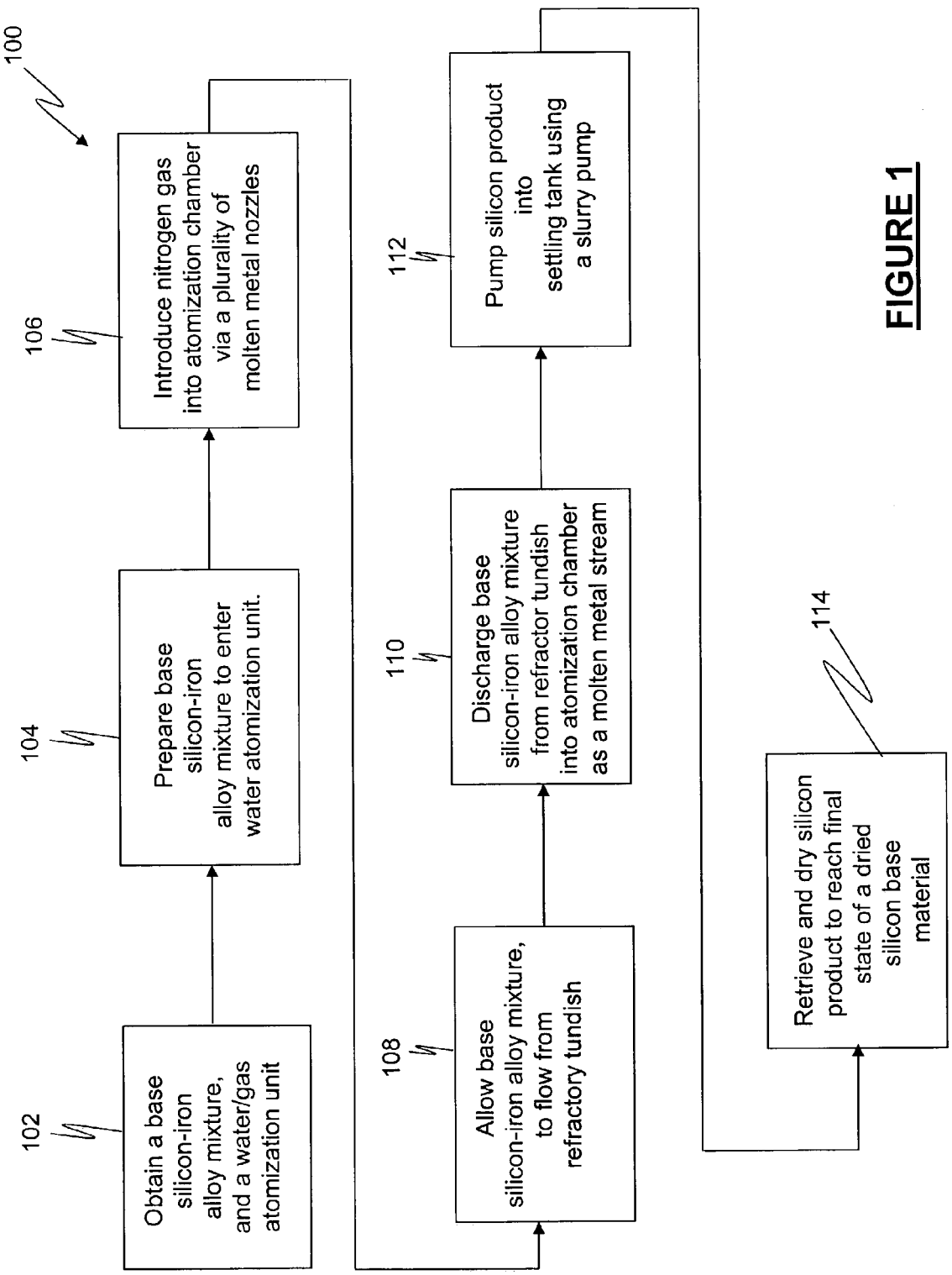
FIG. 1 shows a block diagram illustrating a method for producing silicon or silicon based alloys in an atomized form.
Figure 2:
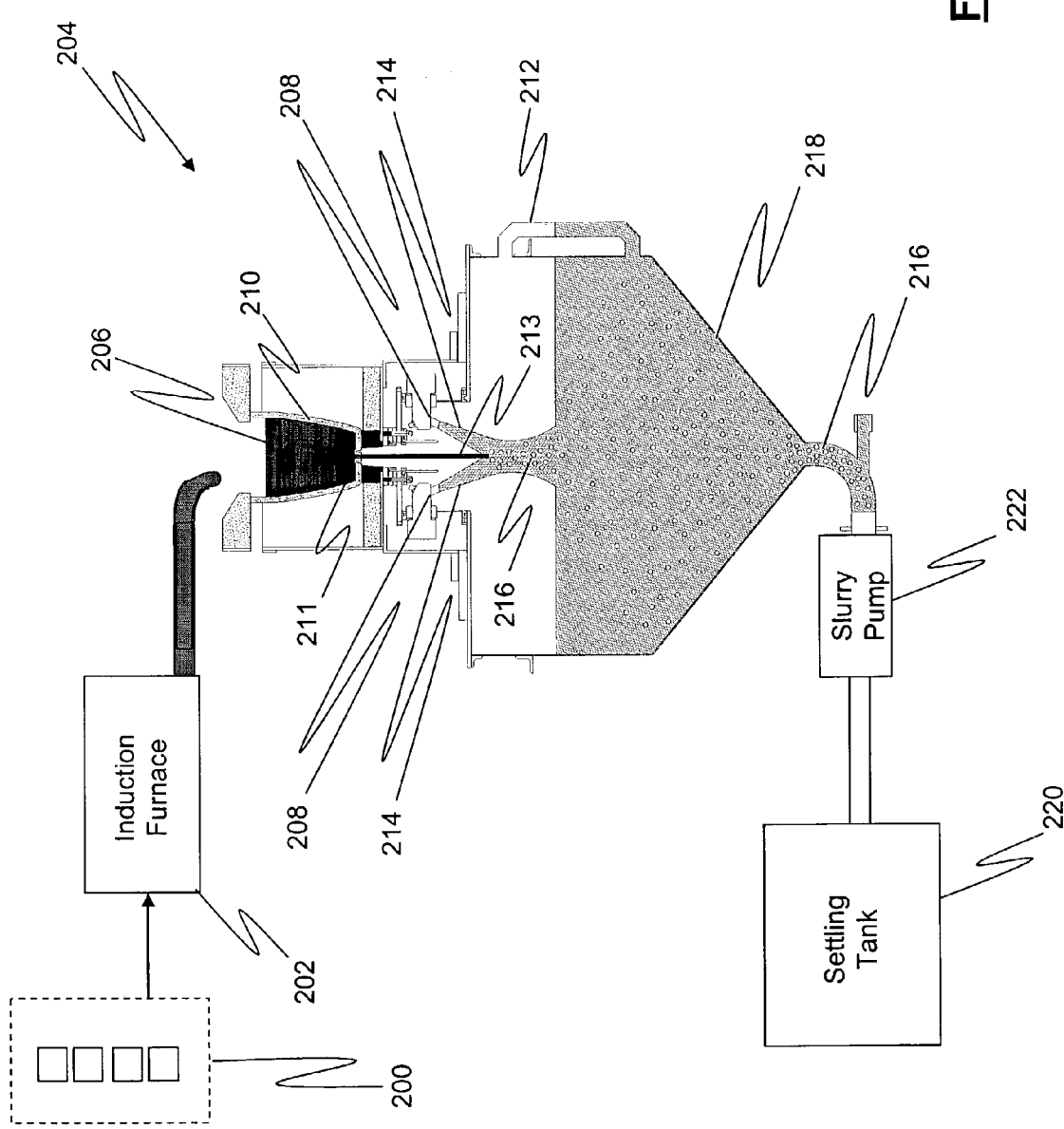
FIG. 2 shows an induction furnace and an atomization unit.

Referring to FIGS. 1 and 2, a block diagram of a method 100 for producing silicon and silicon based alloys in atomized form and an atomization unit, respectively, is shown and discussed. In accordance with an exemplary embodiment, a plurality of elements 200, an induction furnace 202 and an atomization unit 204 are obtained, as shown in block 102, wherein plurality of elements 200 includes silicon or a silicon-iron mixture. Plurality of elements 200 are disposed within induction furnace 202 and heated such that plurality of elements 200 are melted into a molten metal liquid of base silicon or silicon-iron alloy mixture 206. Although plurality of elements 200 preferably includes silicon or a silicon-iron alloy mixture, plurality of elements 200 may also include a plurality of elements comprised of calcium, aluminum, manganese, barium, bismuth, magnesium, zirconium and rare earth. Moreover, it is contemplated that plurality of elements 200 may be comprised of any element or elements suitable to the desired end purpose.

Base silicon or silicon-iron alloy mixture 206 was then prepared to enter atomization unit 204, as shown in block 104. In accordance with an exemplary embodiment, atomization unit 204 preferably includes a plurality of nozzles 208, a refractory lined tundish 210 having a metered nozzle 211 and an atomization chamber 212, wherein metered nozzle 211 may range in size from approximately 9 mm to approximately 12 mm in diameter and wherein refractory lined tundish 210 is disposed over atomization chamber 212 and is capable of holding a twelve inch head of molten metal. Atomization chamber 212 is preferably a sealed chamber having a vacuum capability and includes a vacuum held on the chamber of about ½ atmosphere of pressure. Although atomization chamber 212 preferably includes a vacuum held on the chamber of about −½ atmosphere of pressure, the vacuum may be held on the chamber via any slightly negative atmosphere of pressure suitable to the desired end purpose, such as −1 atmosphere of pressure. An atomizing substance 214 is then introduced into atomization chamber 212 via plurality of nozzles 208, as shown in block 106, such that atomization chamber 212 is filled with atomizing substance 214 to inert or empty atomization chamber 212 of any oxygen. Although atomizing substance 214 is preferably nitrogen, atomizing substance 214 may be any atomizing substance suitable to the desired end purpose. It should be noted that the nitrogen was supplied to atomization chamber 212 at a pressure great enough to counteract a vacuum held on the chamber of approximately ½ atmosphere of pressure.

Once the base silicon or silicon-iron alloy mixture 200 has been melted into a molten metal liquid, the base silicon or silicon-iron alloy mixture 200 is allowed to flow from induction furnace 202 to refractory tundish 210, as shown in block 108. Base silicon or silicon-iron alloy mixture 200 is then discharged from refractory tundish 210 into atomization chamber 212 via metered nozzle 211 as a molten stream 213, as shown in block 110. Molten stream 213 is then allowed to free-fall through atomization chamber 212 such that plurality of nozzles 208 concentrically surround molten stream 213. This advantageously converts molten stream 213 into silicon product 216 of fine size particles, which are allowed to fall into a pool of cooling substance 218, such as water and/or gas. Silicon product 216 is then pumped into a settling tank 220 using a slurry pump 222, as shown in block 112. Cooling substance 218 is then allowed to settle through a screen and is pumped away to be recycled or discarded. Silicon product 216 is then retrieved and dried further to reach its final state of a dried 5 by 100 mesh (or any other suitable mesh sizes) silicon or silicon base material, as shown in block 114.

It will be appreciated that method 100 for producing silicon or silicon based alloys in atomized form advantageously produces a very homogenous metallurgical structure which includes finer grains alloying additions that are uniformly distributed throughout. This is because of the way the product is cast and solidified under very rapid cooling conditions. Moreover, it will be further appreciated that method 100 for producing silicon or silicon based alloys in atomized form not only produces individual particles that are dense with very little porosity in the individual grains, but also produces particles that appear to have more rounded shapes and sizes, wherein the various particle sizes fall into a normal bell shaped curve given a 20 by 80 mesh screen distribution. Additionally, the final silicon product 216 may be dried and screened such that individual particles are allowed to retain its almost perfect spherical form with a minimal amount of dust. It will also be appreciated that when compared to the crushing and sizing of the conventional method of producing silicon or silicon based alloys, the atomized material shows a significant improvement in cost and yield properties, from a conventional process yield of fifty percent to an atomized process yield of about ninety five percent.

The advantages method 100 for producing silicon or silicon based alloys in atomized form are discussed below in terms of a plurality of sample test runs. Referring to Appendix A, test data 300 representing a first production run is shown and includes measurements responsive to the run number or heat number 302, which includes a furnace number, the month the run was performed and the tap ID for identification. Additionally, test data 300 includes the product grade 304 which represents the specific alloy that was made containing the 10 to 100% by weight silicon metal and the pour temperature 306 which is assessed in degrees Fahrenheit. During this first production run, a mixture of nitrogen gas was used with water to atomize the base silicon or silicon-iron alloy mixture 200, wherein the corresponding atomization pressure 308 used is shown to the far right of test data 300. Additionally, a vacuum is maintained on atomization chamber 212 which is also made up of water input in gallons per minute 310. Air and water temperature are also taken within atomizing chamber 212 and are registered in degrees Fahrenheit. Moreover, an oxygen content and a calcium content in percent weight is assigned to the product and a calculation of the ratio of calcium content versus oxygen content is performed.

Referring to Appendix B, test data 400 representing a second production run is shown and includes measurements responsive to the run number or heat number 402, which includes a furnace number, the month the run was performed and the tap ID for identification. Additionally, test data 400 includes the product grade 404 which represents the specific alloy that was made containing the 10 to 100% by weight silicon metal and the pour temperature 406 which is assessed in degrees Fahrenheit. During this first production run, a mixture of nitrogen gas was used with water to atomize the base silicon or silicon-iron alloy mixture 200, wherein the corresponding atomization pressure 408 used is shown to the far right of test data 400. As above, a vacuum is maintained on atomization chamber 212 which is also made up of water input in gallons per minute 410. Air and water temperature are also taken within atomizing chamber 212 and are registered in degrees Fahrenheit. Additionally, an oxygen content and a calcium content in percent weight is assigned to the product and a calculation of the ratio of calcium content versus oxygen content is performed.

Moreover, variables that describe the atomizing nozzle size and weight percentages of the silicon base alloys are also shown. The metering nozzle 211 is preferably registered in millimeters and the molten flow rate is preferably registered in kilograms/minutes. The slurry temperatures in degree Celsius, the nitrogen flow in liters per minute and the metal flow rate in kilograms per minute. The metering nozzles 208 are fitting sizes for standard nozzles and the flow number, which is responsive to a desired flow capacity, is a variable that uses nozzle sizes to represent the fluid flow number.

Figure 3:
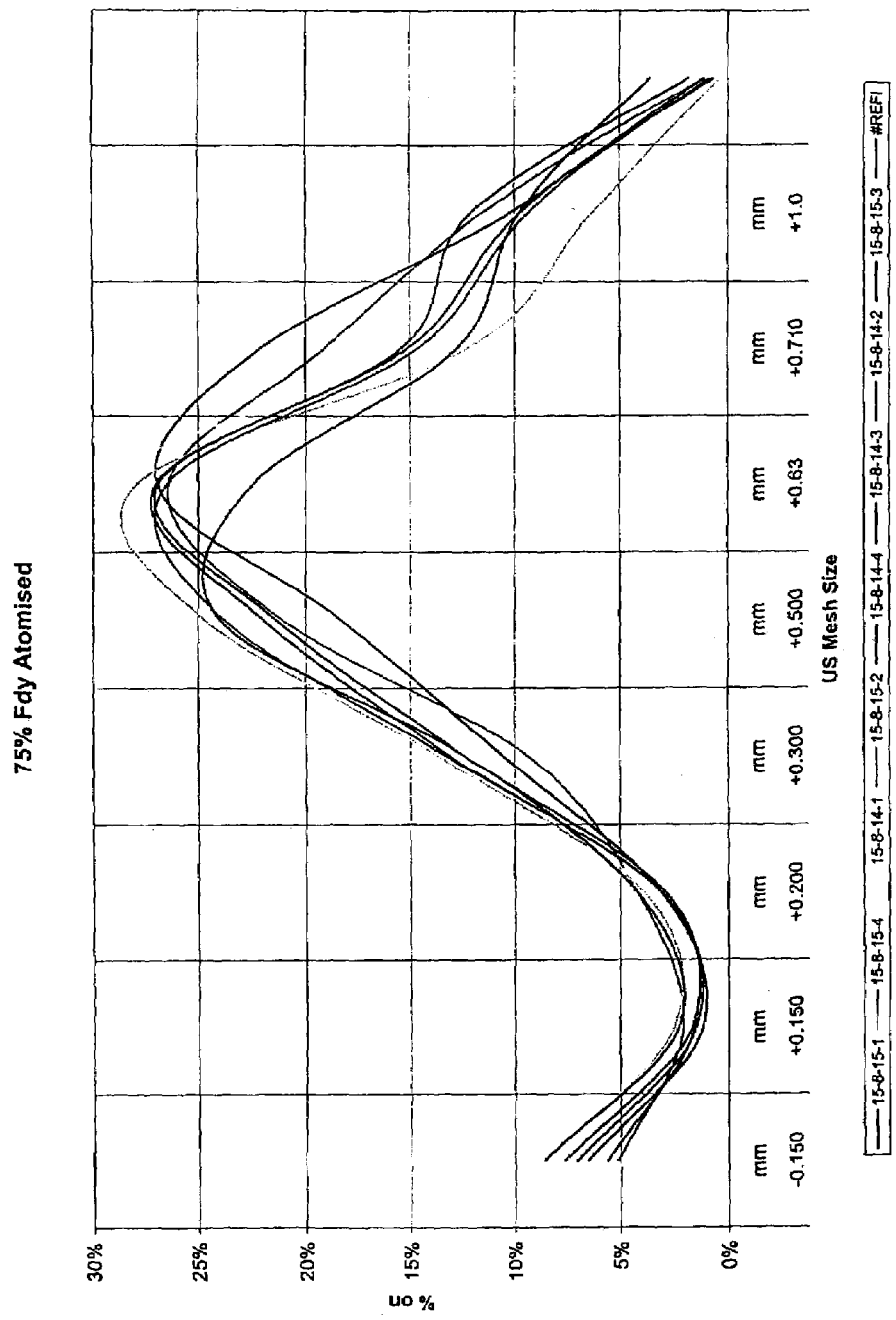
FIG. 3 shows a product size versus percent product weight distribution graph for a 75% silicon foundry atomized product.
Figure 4:
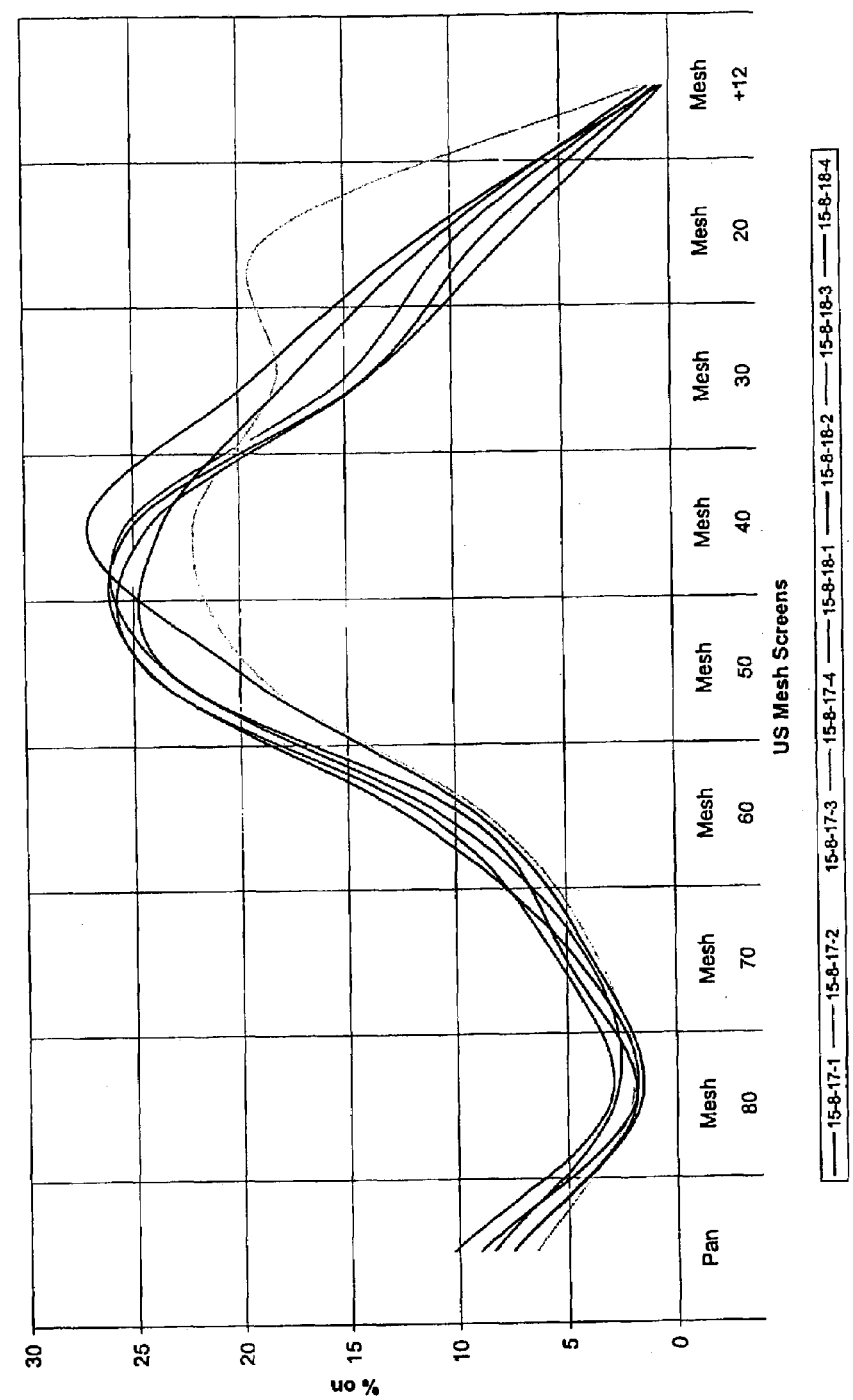
FIG. 4 shows a product size distribution by weight percent versus mesh size graph for a 75% silicon 2 RE (rare earth) atomized product.

Referring to FIG. 3, a graph showing a 75% silicon foundry atomized product is shown and represents the product size, in distribution in millimeters, versus a percent product weight distribution. As can be seen, the product fits a normal bell shaped curve. Additionally, referring to FIG. 4, a graph showing a 75% silicon 2 RE (rare earth) atomized product is shown and represents the product size distribution by weight percent versus mesh size.

It should be noted that during the first and second atomized product trial runs, which were conducted in a ductile iron foundry, several advantageous product characteristics were observed relating to a microstructure analysis and a thermal analysis conducted on the product. The microstructure analysis revealed that all atomized inoculants increased the nodule counts, that all atomized inoculants reduced the carbide contents and that all the inoculants increased the ferrite content while slightly decreasing the pearlite content. The thermal analysis revealed that all the atomized inoculants decreased the liquidus temperature, that all atomized inoculants increased the eutectic temperature and that all the atomized inoculants increased the solidus temperature.

It should also be noted that additional production test runs were conducted on a first highly automated production line and a second highly automated production line disposed at another ductile iron foundry, wherein the first highly automated production line produced conventional material and wherein the second highly automated production line produced atomized material. Referring to FIG. 5, the results from these additional production test runs are shown and discussed. It was determined that the atomized product showed less dust at the impact site resulting in an environmentally cleaner process and in a greater recovery of the alloy. Moreover, due to the flowability of the product, the addition rate was decreased and the recovery of the elements were not significantly different from the product produced via the conventional process versus the atomization process. Similarly, all other metallurgical variables (i.e.: nodularity, presence of carbides) were also comparable. Referring to FIG. 6, the results from production test runs showing a comparison of a convention method, a water atomization method and a gas atomization method.

It will be appreciated that the method for producing silicon based alloys in atomized form as disclosed herein reduces dust formation near the molten metal stream as compared to the convention crushed product, advantageously resulting in a very clean and environmentally friendly atmosphere near the place of application where workers are most likely to inhale any inoculant dust. Additionally, it will be appreciated that the flowability of the atomized material was approximately between 10–30% better than the conventional material. This is due to the spherical shape of the particles, which seem to convey itself into the injection system with ease and with lower pressure. Moreover, there appears to be fewer tendencies for material bridging in the pipe with the atomized product as compared to the conventional product which experiences locking of particles due to their angular shape.

The data also show that there is less wear and tare of the conveying equipment and movable parts of the injection equipment with the atomized product than with the conventional product. Because they are spherical and have no sharp corners or edges, the atomized particles flow easily under pressure when flowing vertically. Furthermore, the stream of the atomized inoculant appears to be more narrow and easier to target into the metal stream than the conventional material. Hence, there is less wastage on top of the mold and less contamination of the sand with the atomized product. It will also be appreciated that all the atomized products performed satisfactory metallurgical functions when added to the iron. The carbide content was advantageously eliminated, the nodule count significantly increased and the pearlite content was reduced at the same time the ferrite content was increased. Moreover, the atomized product is easily added into the solution both via the material stream as well as when added to a small pool of metal in a cup.

We claim:
1. A method for producing an alloy in atomized form, wherein the alloy is comprised of between about 10% to about 100% of silicon or a silicon based alloy, comprising:
obtaining a base silicon or base silicon-iron alloy mixture and an atomization unit having an atomization chamber and a plurality of nozzles;
injecting an atomizing substance into said atomization chamber via said plurality of nozzles;
introducing said base silicon or base silicon-iron alloy mixture into said atomization chamber as a molten metal stream such that said atomizing substance impinges on said base silicon or base silicon-iron alloy mixture to produce the alloy in atomized form;

cooling the alloy in atomized form using a pool of water so as to produce a cooled alloy product, wherein the product is substantially spherical;

retrieving said cooled alloy product; and drying said cooled alloy product to produce the alloy in atomized form.

2. The method of claim 1, wherein said atomization unit is a water atomization unit.

3. The method of claim 1, wherein said atomization unit is a gas atomization unit.

4. The method of claim 1, wherein said base silicon-iron alloy mixture includes at least one of the elements of, calcium, magnesium, aluminum, barium, strontium, bismuth, manganese, rare earths, titanium, carbon, sulfur, oxygen, nitrogen, phosphorous, zirconium.

5. The method of claim 1, wherein the alloy in atomized form includes atomized particles having sizes in the range of about 5-mesh to about 500-mesh.

6. The method of claim 1, wherein at least a portion of said atomizing substance is an inert gas and is used to make the molten metal stream into droplets of various sizes.

7. The method of claim 1, wherein at least a portion of said atomizing substance is an inert liquid and is used to make the molten metal stream into droplets of various sizes.

8. The method of claim 1, wherein said injecting includes injecting said atomizing substance into said atomization chamber to modify the metallurgical properties of the alloy in atomized form.

* * * * *